United States Patent [19]
Srinivasan

[11] Patent Number: 5,724,412
[45] Date of Patent: Mar. 3, 1998

[54] METHOD AND SYSTEM FOR DISPLAYING INTERNET IDENTIFICATION ON CUSTOMER PREMISES EQUIPMENT

[75] Inventor: Thiru Srinivasan, Highlands Ranch, Colo.

[73] Assignee: U S West, Inc., Englewood, Colo.

[21] Appl. No.: 727,161

[22] Filed: Oct. 7, 1996

[51] Int. Cl.$^6$ .................................................. H04M 11/00
[52] U.S. Cl. ........................................ 379/93.23; 379/142
[58] Field of Search ........................ 379/93.23, 93.17, 379/90.01, 93.01, 93.05–93.08, 67, 88, 89, 142, 136, 199, 379

[56] References Cited

U.S. PATENT DOCUMENTS

| | | | |
|---|---|---|---|
| 5,138,653 | 8/1992 | Le Clercq | 379/96 |
| 5,278,894 | 1/1994 | Shaw | 379/67 |
| 5,293,250 | 3/1994 | Okumura et al. | 358/402 |
| 5,315,635 | 5/1994 | Kane et al. | 379/57 |
| 5,327,486 | 7/1994 | Wolff et al. | 379/96 |
| 5,361,256 | 11/1994 | Doeringer et al. | 370/60 |
| 5,406,557 | 4/1995 | Baudoin | 370/61 |
| 5,479,411 | 12/1995 | Klein | 370/110.1 |
| 5,479,472 | 12/1995 | Campana, Jr. et al. | 379/58 |
| 5,479,491 | 12/1995 | Herrero Garcia et al. | 379/88 |
| 5,608,788 | 3/1997 | Demlow et al. | 379/142 |
| 5,623,537 | 4/1997 | Ensor et al. | 379/142 |

*Primary Examiner*—Wing F. Chan
*Attorney, Agent, or Firm*—Ross Sheridan

[57] ABSTRACT

A method and system for providing a telephony subscriber with Internet information related to a caller attempting to call the subscriber is disclosed. The Internet information is provided to the customer premises equipment of the subscriber during the first and second ring of a call. Subsequently, if the call is not completed, then the caller's Internet information is accessible at a later time, along with any corresponding voice mail associated with the call and any caller-ID information such as the caller's name and/or telephone number. Additionally, the present invention allows the subscriber to request that caller information corresponding to an incomplete call to the subscriber be presented to the caller's customer premises equipment in one of the forms: all text, all vocalized in speech or a combination of text and vocalized speech.

23 Claims, 8 Drawing Sheets

METHOD AND SYSTEM FOR DISPLAYING INTERNET IDENTIFICATION ON CUSTOMER PREMISES EQUIPMENT

FIELD OF THE INVENTION

The present invention relates to providing a telephony service wherein a callee can receive a caller's Internet address as part of caller identification information with, for example, other caller-ID information.

BACKGROUND OF THE INVENTION

With the widespread use of caller identification and messaging services, telephony subscribers have been able to identify a caller prior to initiating a conversation with the caller. Moreover, subscribers are also able to identify a caller (or at least the location from which a caller calls) through the automated capture of caller identification information by telephony providers so that even if a caller is unable to answer a call, the callee may, at a later time, review caller messages and caller identification information retained by the telephony provider.

However, with the increasing utilization of the Internet for communication, many telephony subscribers prefer to respond to callers via the Internet. Accordingly, it would be desirable for subscribers to be able to obtain a caller's Internet address in an automatic fashion as, for example part of the caller identification information supplied to subscribers by telephony providers.

SUMMARY OF THE INVENTION

The present invention is a method and system for providing a telephone user Internet information related to a caller attempting to call the user. In particular, the user, also known as the callee, upon requesting utilization of the present invention, can receive Internet identification information related to a caller from the callee's local telephony provider regardless of how the caller's call is transmitted. That is, the present invention makes such Internet identification information available to the callee regardless of whether some portion of the call is transmitted through the Internet or not. Moreover, such caller related Internet identification information can be presented to the callee prior to the callee's answering the call from the caller, or alternatively, if, for example, the callee is not available to receive the call, then the callee may retrieve such information at a later time. Thus, the present invention is useful for providing various types of Internet identification information depending upon the type of Internet communication capabilities the caller has. In particular, the Internet identification information may include one or more of the caller's e-mail address, the caller's Universal Resource Location (URL) identifier, a Gopher address, a Wide Area Information Server (WAIS) address and a file transport protocol (FTP) address.

In one aspect of the present invention, the hardware/software for providing the functionality of the present invention is integrated into the functionality provided by telephony central offices. More particularly, the present invention is activated by the central office that is directly connected to the callee's telephony station for providing telephony service to the callee. Thus, the present invention may be easily integrated into the present infrastructure for telephony services in that no additional control signals or additional data need be transferred between central offices for completing a call.

In another aspect of the present invention, note that the callee may designate the format of the Internet identification information provided to him/her. In particular, this information may be provided in an audio form wherein the callee may listen to the Internet identification information or alternatively, in a visual format such as text wherein the callee may view this information on, for example, a computer screen or other such visual output devices attached to the callee's telephony line. In particular, the present invention contemplates providing a textual version of such Internet identification information on an enhanced caller-ID device at the callee's premises, wherein such enhanced devices have enlarged screens for accommodating one or more Internet identification addresses or locations.

In yet another aspect of the present invention, the Internet identification information for a caller is provided to the callee with additional caller information such as caller-ID information. Thus, for a callee subscribing to both the services of the present invention and the caller-ID service, the callee may obtain the caller's name, telephone number and Internet identification prior to accepting the call. Additionally, if the callee chooses to not accept the call or is unavailable, the present invention allows the callee to retrieve the caller's identifying information via, for example, an interactive telephony interface activated when the callee calls a predetermined telephone number (and optionally provides a personal PIN number or code). Further, note that depending upon the predetermined telephone number and/or the personal identification code, the Internet identification information, as well as other caller identification information, may be provided in either an audio or a visual format so that the user may listen to such caller identification information as well as any caller voice message left, or alternatively, the callee may receive such information in text format so that the text may be displayed on a callee premises device such as a computer or an enhanced caller-ID device.

It is yet another aspect of the present invention that if the callee requests a caller's Internet identification information to be provided in a visual format, that the present invention may, in addition to the Internet identification, also automatically provide the callee with an Internet display page related to the caller. Thus, this aspect of the present invention may provide the callee with a quick and easy way to communicate with a caller, such as via e-mail, Internet hyperlinks, or accessing a caller's home page.

It is yet another aspect of the present invention for the callee to be able to receive the Internet identification information through an Internet phone system at the premises of the callee. That is, it is an aspect of the present invention that the callee's Internet phone call processing system be modified to accept and utilize caller Internet identification information provided by the local telephony provider.

In another aspect of the present invention, directory assistance systems are modified to also provide Internet identification information in a user-specified format such as audio or visual.

In one embodiment of the present invention, the Internet identification information is provided by an Internet identification database that is accessible form a plurality of central offices for receiving Internet identification information requests wherein such requests provide the caller's telephone number as an index into this database.

The present invention has a number of advantages, including the following:

(a) the present invention reduces "telephone tag" in that the callee, when provided with the caller's Internet address, may easily respond through the Internet with a substantially wider and more detailed reply to the caller than is possible with merely using voice mail;

(b) the present invention allows a callee to capture information regarding callers so that this information may be used at a later date for responding to callers;

(c) the present invention also provides a straightforward and automatic mechanism for allowing the automatic entry of Internet identification information into a callee's business records when phoned by a caller requesting information and/or purchasing an item; and (d) the present invention is straightforward to implement within the infrastructure of local telephony providers.

Other advantages and features of the present invention will become evident in the figures and associated detailed description provided hereinafter.

DETAILED DESCRIPTION OF THE PREFERRED EMBODIMENT

Figure 1A:
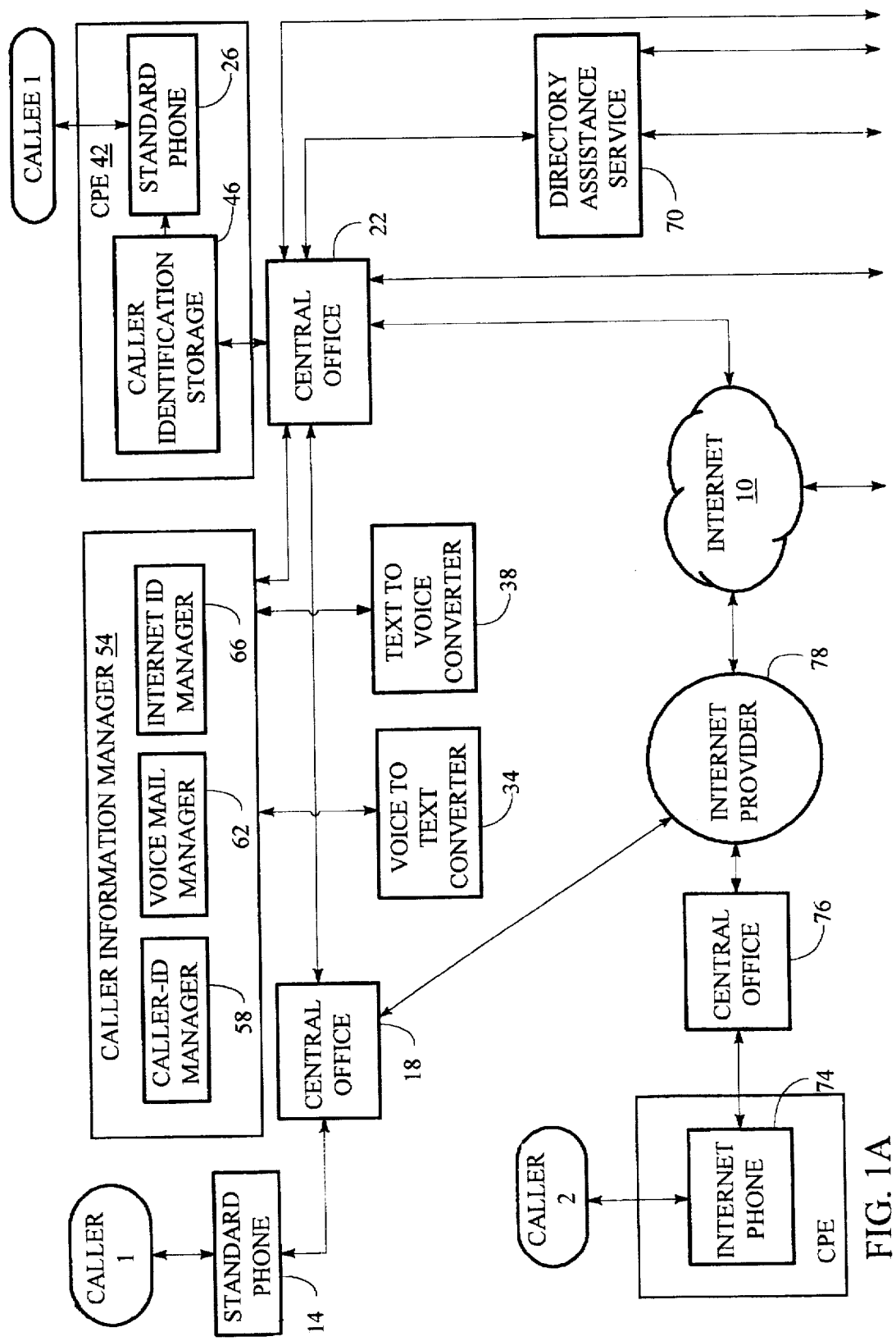
FIGS. 1A and 1B provide a block diagram of the telephony and Internet components used in one embodiment of the present invention.
Figure 1B:
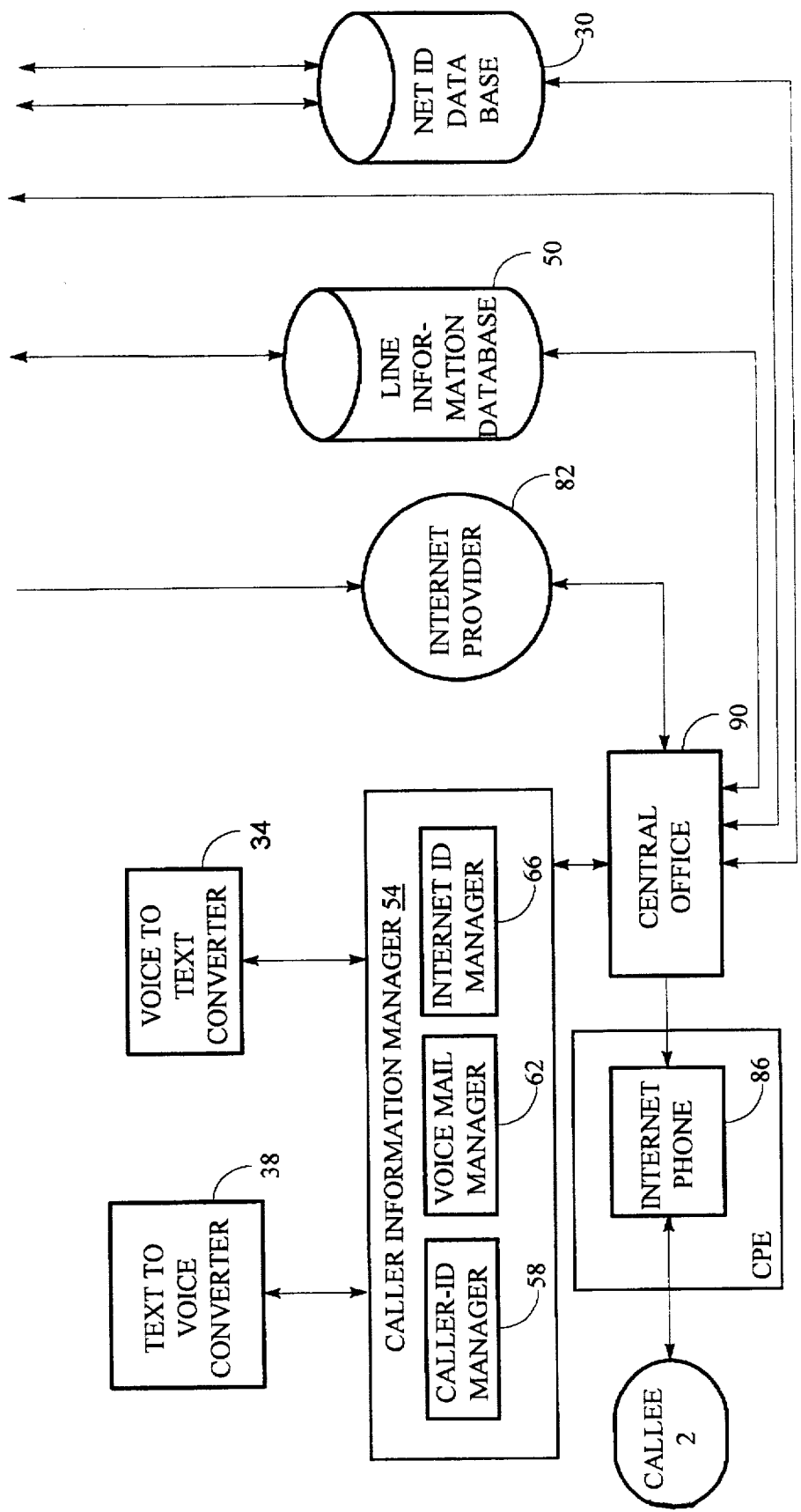

FIGS. 1A and 1B illustrate a block diagram of the hardware/software modules for the present invention in the context of both a telephony provider and Internet communications. In particular, four users denoted caller 1, caller 2, callee 1 and callee 2 are illustrated as communicating in various combinations. Note that the arrows in FIGS. 1 denote telephony and/or Internet signal transmissions. Accordingly, caller 1 is the caller to callee 1 via conventional telephony call completion techniques. Additionally, caller 2 is the caller to callee 2 wherein at least some portion of both of the call to callee 2 utilizes the Internet 10 for completing and maintaining the call. Referring now to the present invention in the context of a call from caller 1 to callee 1, caller 1 interacts with, for example, a standard phone 14 to dial the telephone number for callee 1, this number being transferred to the central office 18 providing local telephony service for caller 1. That is, the central office 18 (and central offices in general) provide telephony circuit switching for activating and maintaining calls. Subsequently, as is well known in the art, central office 18 and the central office 22 provide local telephony service to caller 1 communicate with one another for establishing and maintaining telephony circuitry for activating a call to callee 1. Accordingly, during the ringing of the phone 26 for callee 1, the present invention is utilized to provide callee 1 with any available Internet identification information for caller 1. To provide this capability, central office 22 communicates with the net ID database 30 for retrieving Internet identification information related to caller 1 that is stored therein. That is, since the net ID database 30 stores one or more Internet addresses for each Internet user entered in this database and since each such entry is indexed by one or more phone numbers corresponding to the user of the entry, then for each central office query, in the present context, the net ID database uses the caller's phone number for retrieving any corresponding Internet address(es). Subsequently, assuming that one or more Internet identifications are retrieved from the net ID database, the central office 22 activates the caller information manager 54 for providing the retrieved Internet identification information in the format(s) desired by caller 1. That is, callee 1 can have the Internet identification presented in at least one of a text and a voice presentation. Accordingly, the caller information manager 54 includes or is able to activate a text-to-voice converter 38 for translating at least Internet identification information for caller 1 into the desired presentation format(s) compatible with the customer premises equipment (CPE) 42 for callee 1.

Note that the caller information manager 54 allows the callee to retrieve caller information provided by a caller or derived automatically from, for example, stored information retrievable using the caller's telephone number. In particular, caller information may be retrieved when the caller's call is not completed due to, for example, the caller hangs up or the callee (e.g., callee 1) is unable to answer the phone. In particular, FIGS. 1A and 1B present the caller information manager 54 as having three internal managing components for managing caller information stored by the telephony network and subsequently accessible by the callee. That is, the following managers are shown:

(1.1) A caller-ID manager 58 for storing and controlling caller-ID information regarding uncompleted calls to the callee;

(1.2) A voice mail manager 62 for storing and controlling voice mail recorded by a caller when the callee does not respond to the call; and (1.3) An Internet ID manager 66 for storing and controlling caller Internet identification information related to calls for which the callee does not respond.

Note that depending upon the telephony services to which a callee has subscribed, caller information for a call not completed to the callee may be managed by any combination of the three managers 58, 62 and 66. Thus, in one embodiment of the present invention, each of the managers 58, 62 and 66 access their respective information repositories (not shown) for caller information using the telephone number of the callee. Moreover, to coordinate caller information between the three managers 58, 62 and 66, the caller information manager 54:

(2.1) Queries the managers 58, 62 and 66 for the number of caller entries for a particular callee;

(2.2) Receives caller requested information from the managers 58, 62 and 66 and assembles a caller information packet (having information regarding a particular caller) that is subsequently communicated to, for example, the callee 1 via the central office 22; and (2.3) Sends messages to the managers 58, 62 and 66 for deleting caller information entries.

Moreover, note that the caller information manager 54 uses caller phone numbers in instructing the managers 58, 62 and 66 in performing (2.2) and (2.3), i.e., the caller information manager 54 supplies the caller number to the managers 58, 62 and 66.

As an aside, note that in some embodiments, the managers 58, 62 and 66 may be combined in various combinations depending, for example, on the software architecture of the caller information manager 54. For instance, assuming the voice mail manager 62 manages recorded caller messages while the caller-ID information and the caller Internet identification information are provided in a similar textual record format, then a common manager may be used for both of these latter types of caller information. However, note that at least the caller Internet identification information may include a plurality of relatively long character strings corresponding to various types of Internet addresses for the caller (e.g., a URL, a GOPHER address, a WAIS address, and/or an FTP address) as one skilled in the art will appreciate.

Note that in the present context, the CPE 42 may include both a standard telephone 26 and a caller identification storage unit 46 for capturing or storing caller identification information (denoted "caller-ID information" or simply "caller-ID") provided by the central office 22. Additionally, CPE 42 may also include a data terminal or monitor and a modem operatively connected to the central office 22 for receiving and displaying, for example, text for caller-ID information and Internet identification information as well as the voice mail converted into a textual form via the voice to text converter 34. Thus, the central office 22 may provide, in addition to the Internet identification information, caller-ID information (e.g., a caller's name) retrieved from the Line Information Database 50 (denoted herein as "LIDB"). Thus, by storing both caller-ID information and the Internet identification information in an enhanced version of the caller identification storage unit 46 at the premises of callee 1, the callee may consequently use the Internet to contact caller 1 via such stored Internet identification information.

In a related aspect of the present invention, note that a central office (e.g., central office 22) may be also connected to a directory assistance service 70 that, in turn, utilizes the net ID database 30 for supplying a telephony user with Internet identification information. Accordingly, note that, in this context, the net ID database has various retrieval index fields in addition to the association of one or more phone numbers for an Internet user with one or more Internet addresses. In particular, the net ID database 30 also associates an Internet user's name and principal address with a user's Internet information.

FIGS. 1A and 1B also illustrate an alternative configuration for activating a call between a caller (caller 2) and a callee (callee 2), wherein the Internet 10 is used for connecting the caller to the callee. In this scenario, the caller utilizes an Internet phone 74 integrated in, for example, with a caller's personal computer for accessing the Internet via the caller's Internet provider 78. Thus, by using the Internet phone 74, the caller 2 may contact either callees having a standard phone or callees also having an Internet phone and who are logged into the Internet such as is caller 2 via Internet provider 82. It is an aspect of the present invention that when caller 2 calls callee 2 that the Internet phone for callee 2 has been enhanced to accommodate the presentation of caller Internet identification information prior to callee 2 answering his/her Internet phone 86. Note that, in this case, such caller information may be provided in the initial caller activation of the call instead of having such information supplied by the local telephony network as discussed regarding caller 1 and callee 1 above. Accordingly, it is an aspect of the present invention that an embodiment of Internet phone software be modified. In particular, such an Internet phone is modified for both receiving and transmitting communications so that Internet information may be provided to a callee in a manner that is displayable to the callee regardless of whether the caller or the callee is utilizing an Internet phone or more conventional telephony equipment (e.g., a telephone and/or a caller identification storage unit 46). Accordingly, as on skilled in the art will appreciate, the modified Internet phone functionality of the present invention, upon receiving a phone call, must decode caller Internet identification information by identifying the form in which it is provided; e.g., according to standard telephone format (as in FIG. 5) or according to a format based on an Internet protocol. Thus, the central office 90 providing callee 2 with telephony services has substantially the same configuration regarding the present invention as central office 22 for supplying caller Internet identification information to callee 1. However, such Internet information generated at the central office may either be ignored by the modified Internet phone (e.g. in the case of a call via the Internet), or displayed to the callee (in the case of a non-Internet call). Additionally, it is important to note that central office 90 also may be provided with directory assistance service 70 wherein the callee 2 may request Internet identification information for an Internet user via the directory assistance service 70.

Figure 2A:
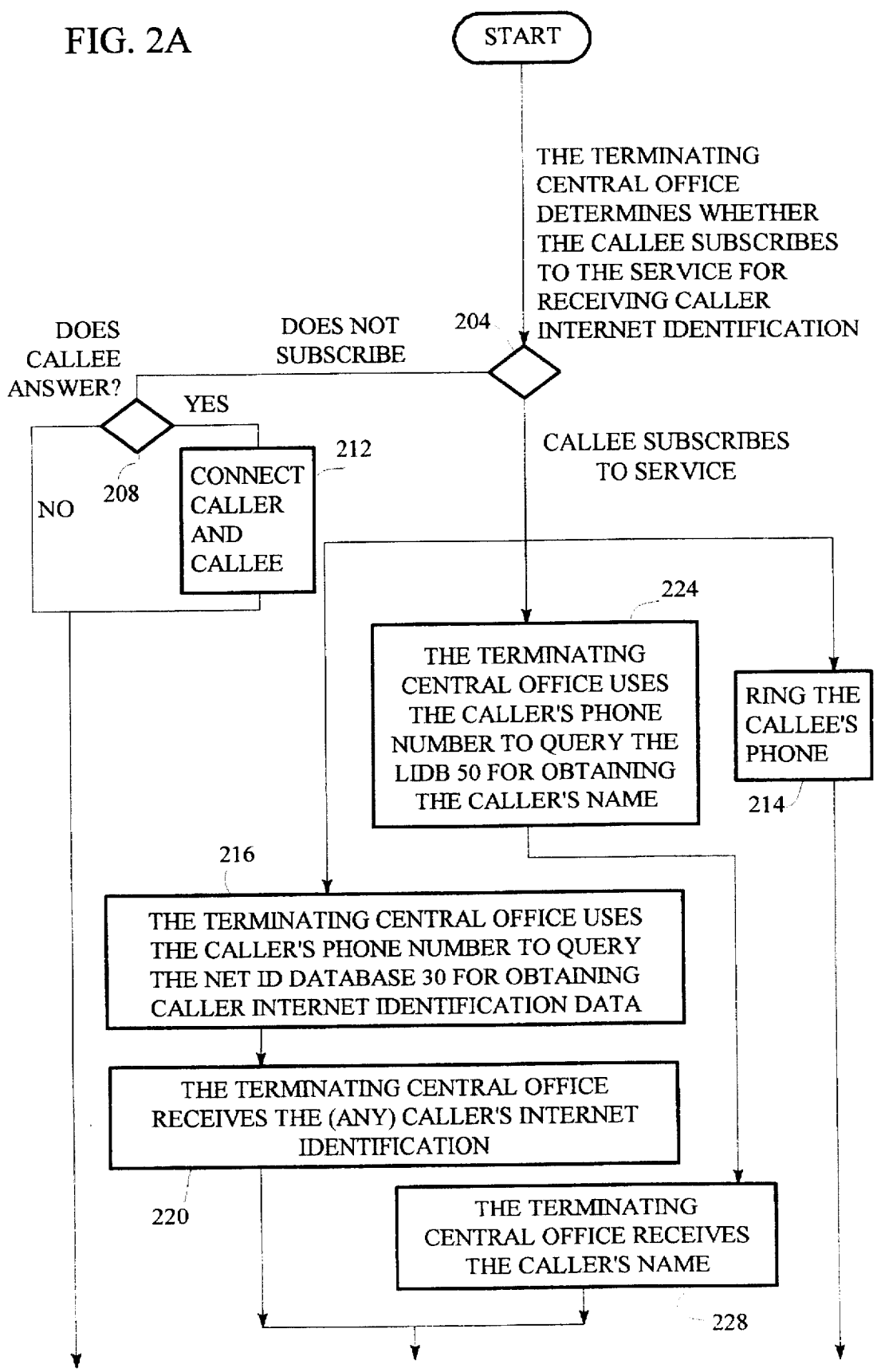
FIGS. 2A and 2B provide a flowchart of the high level steps performed by the present invention when a caller's identification information is being accessed to provide to the callee during the ringing of the callee's phone; in particular, the present flowchart illustrates the steps performed in retrieving the caller's Internet identification information for presentation to the callee.
Figure 2B:
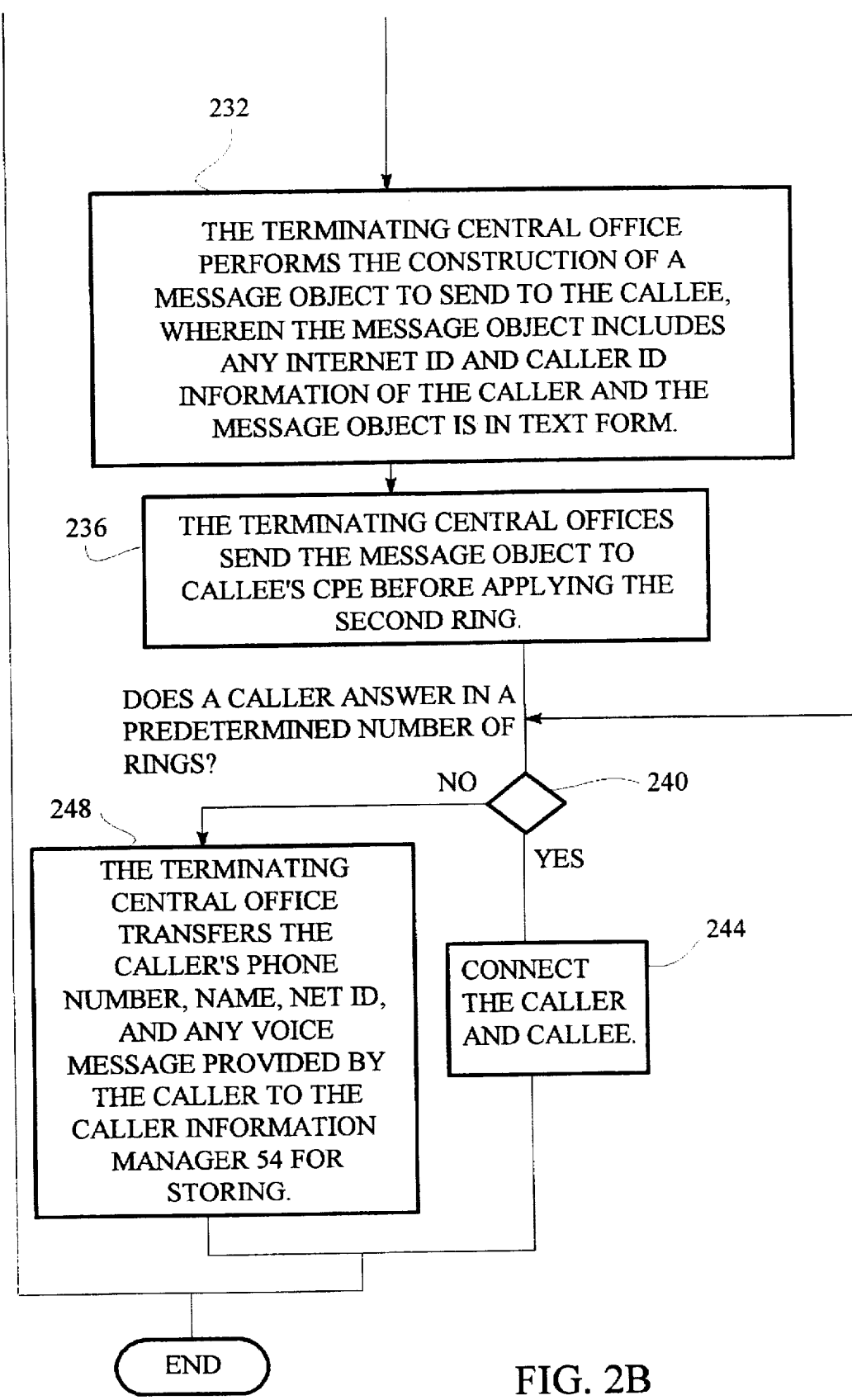

FIGS. 2A and 2B provide a flowchart of the high-level steps performed by the present invention when supplying caller identification information to the callee during the ringing cycle of the callee's phone. Accordingly, when a central office for a callee is activated to complete a call, the central office first determines whether the callee subscribes to the service for receiving Internet identification information. If the callee does not subscribe to the service, then step 208 is encountered for determining whether someone answers the call upon activation of the callee's phone (or the equivalent thereof). Subsequently, regardless of the steps performed on this path of the flowchart, numerous steps may be performed here not pertinent to the present invention. However, steps 208 and 212 (this latter step being where the callee answers the phone and the central office connects the callee and caller) are provided as illustrative.

Figure 5:
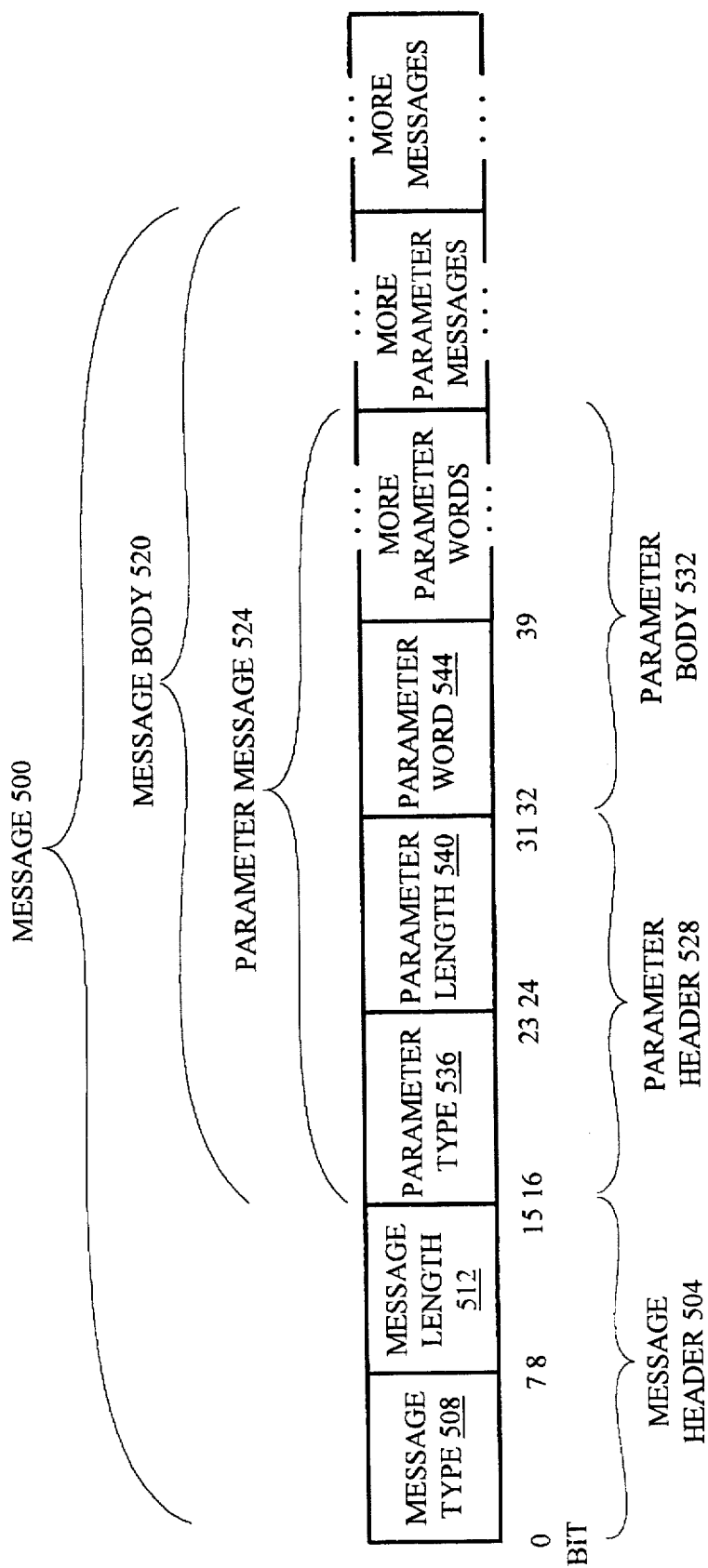
FIG. 5 presents a graphical representation of the data structure for communicating telephony information to customer premise equipment during the first and second rings of a call.

Returning now to step 204, if the callee subscribes to the service for receiving caller Internet identification, then three initially asynchronous paths of steps are activated by the callee's central office. In particular, the steps 214, 224 and 216 may be activated in any order by this central office. However, in one embodiment of the present invention, the caller's Internet identification information is supplied to the callee's CPE during the first and second rings of the callee's phone according to telephony standards such as, Voiceband Data Transmission Interface (TR-NWT-000030, Voiceband Transmission Interface, issue 1, October 1992) for supplying supplemental information such as caller-ID information during the ringing cycle. Accordingly, the caller's Internet identification information is incorporated into a message structure that also includes, for example, information related to various caller-ID services that may also be provided to the subscriber. Thus, to briefly describe the incorporation of caller Internet identification into the message structure provided in telephony standards such as the one mentioned above, reference is made to FIG. 5. In particular, FIG. 5 illustrates a standardized telephony message structure for providing information to the callee's CPE during the ringing cycle of the callee's phone. Accordingly, this Figure illustrates this message structure as message 500 whose subfields are described hereinbelow.

The message header 504 for the message 500 includes a message type 508 and a message length 512. The message type 508 contains an assigned value used to identify the feature to which the message pertains (e.g., call setup, call waiting, etc.). The message length indicates the number of words that follow in the message 500. Both message type 508 and message length 512 are 8-bit words. The message body 520 contains one or more smaller messages denoted by parameter messages 524. Like message 500, each parameter message 524 has a parameter header 528 and parameter body 532. The parameter header 528 consists of the parameter type 536 and the parameter length 540. Both the parameter type 536 and the parameter length 540 are 8-bit words. The parameter type 536 contains a value for identifying the telephony feature which the data in the subsequent parameter word(s) 544 describe. The parameter length 540 indicates the number of parameter words in the parameter body 532. Accordingly, for the message type 508 identified as "call setup" for supplying call information, e.g., during the ringing of a callee's phone, new parameter types 536 may be specified for supplying Internet Information. That is, when such a call setup message 500 is sent to the callee's CPE between the first and second rings, there may be individual parameter messages 524 providing (in a parameter body 532) one or more of the various caller Internet identification addresses such as a URL, a Gopher address, a WAIS address and an FTP address.

Returning now to the flowchart of FIGS. 2A and 2B, independently of step 214 for ringing the callee's phone, step 216 is performed wherein the callee's central office uses the caller's phone number to query the net ID database 30 for obtaining caller Internet identification information. Subsequently, in step 220, the central office for the callee receives the caller's Internet identification from the query. Independently of the performance of steps 216 and 220, as a third path proceeding from step 204, steps 224 and 228 are performed wherein the callee's terminating central office uses the caller's phone number to also query the LIDB 50 for obtaining the caller's name. Subsequently, after receiving the (any) caller Internet identification and caller name (step 228), the central office performs a construction of a message object to send to the callee (step 232), wherein the message object is in the form of message 500 of FIG. 5 and includes any Internet and caller identification information retrieved from the net ID database 30 and the LIDB 50. Subsequently, in step 236, the message object 500 constructed in step 232 is sent to the callee's CPE before applying the second ring to the callee's phone. Note that in providing this message object to the callee's CPE, it is an aspect of the present invention that if caller identification information is displayed at a caller-ID device at the callee's premises, then such a device should have an expanded visual display for allowing the callee to view an entire Internet address without difficulty. Next, in step 240, the callee's terminating central office continues to allow the callee's phone to ring until the callee's phone goes off hook, or until a predetermined number of rings has occurred. Accordingly, in step 240, if the callee answers the phone (i.e., the phone goes off hook), then in step 244, the central office connects the caller and the callee. Alternatively, if the callee's phone does not go off hook within the predetermined number of rings, then in step 248, the terminating central office for the callee transfers the caller's phone number, name, Internet identification information and any voice message provided by the caller to the caller information manager 54 for storing.

Figure 3:
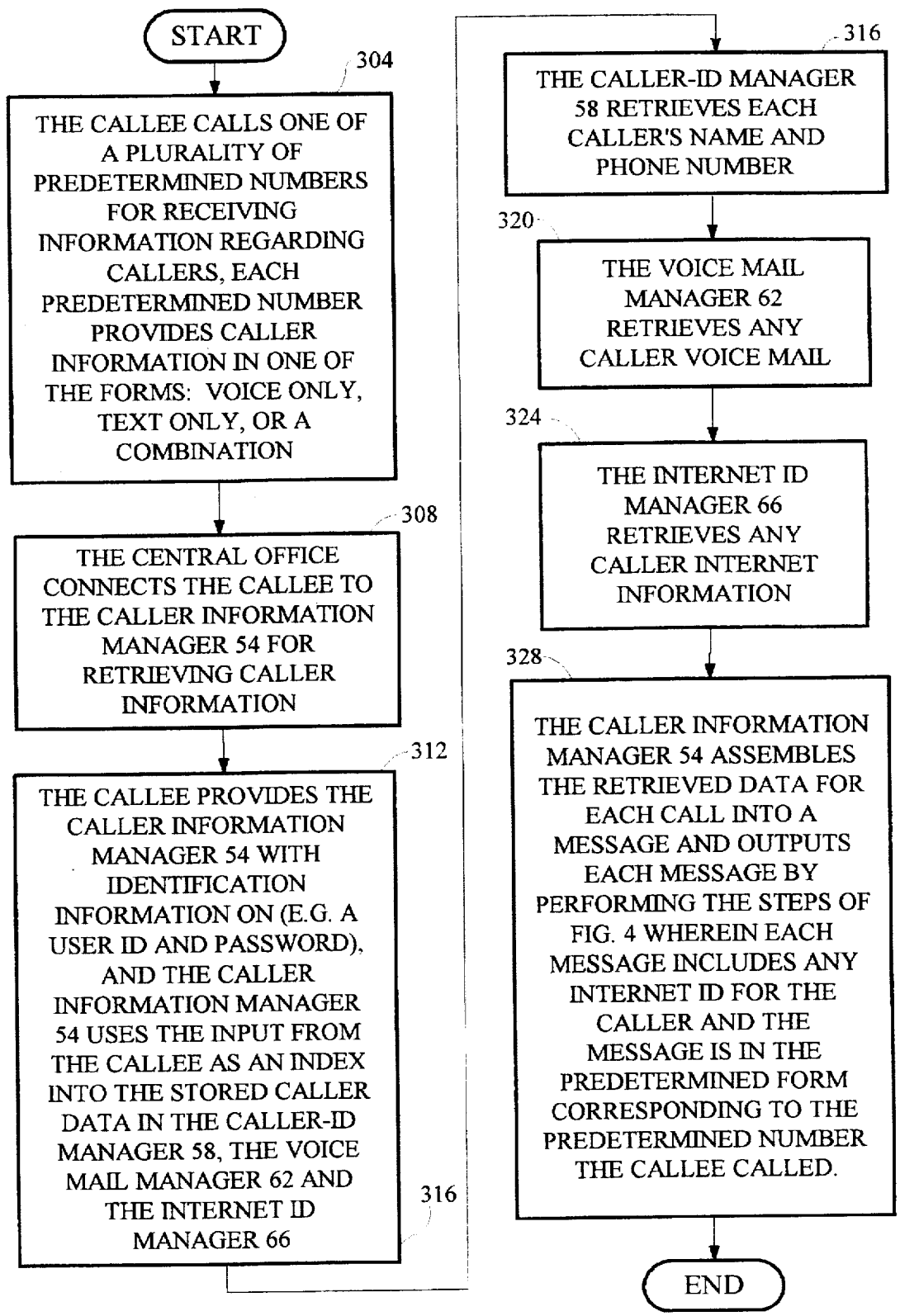
FIG. 3 provides a flowchart of the high level steps performed by the present invention when a callee activates a telephony service for retrieving caller information regarding calls to the callee that were not completed.

FIG. 3 presents a flowchart of the high-level steps performed when a callee calls the caller information manager 54 to obtain information regarding callers. Accordingly, in step 304, the callee calls one of a plurality of predetermined numbers for receiving information regarding callers to the callee. Note that in the present embodiment, there is a different predetermined number for each form the caller information manager 54 may use in outputting information to the callee. In particular, at least the following three forms are contemplated by the present invention: (a) voice only output, wherein all caller information is converted to speech, (b) text only, wherein all caller information is converted to text, and (c) a combination of voice and text, wherein, for example, a caller's voice mail is output as a playback of a recording of the caller's voice message and all other caller information is provided in a text form. Subsequently, in step 308, the callee's central office connects the callee with the caller information manager 54 for retrieving caller information. In particular, the caller information manager 54 interacts with the callee for obtaining callee identification information for validating the identity of the callee. Accordingly, in step 312, the callee provides the caller information manager 54 with identification information such as a user ID and password which the caller information manager 54, in turn, uses as input to the caller-ID manager 58, the voice mail manager 62, and the Internet ID manager 66 so that each of these managers can utilize the input for accessing caller information associated with the callee. Subsequently, in steps 316, 320 and 324, each of the managers 58, 62 and 66 output the (any) caller information for the callee. Finally, in step 328, the caller information manager 54 assembles the retrieved data from each of the managers 58, 62 and 66 so that a message is generated for each call to the callee having data stored in the caller information manager 54. That is, for each call having stored data in the caller information manager 54, the stored data for the call is provided within a message to the callee. Note that in one embodiment of the present invention, the callee's CPE may utilize the Internet addressing information for accessing an Internet website or home page related to a caller substantially automatically.

Figure 4A:
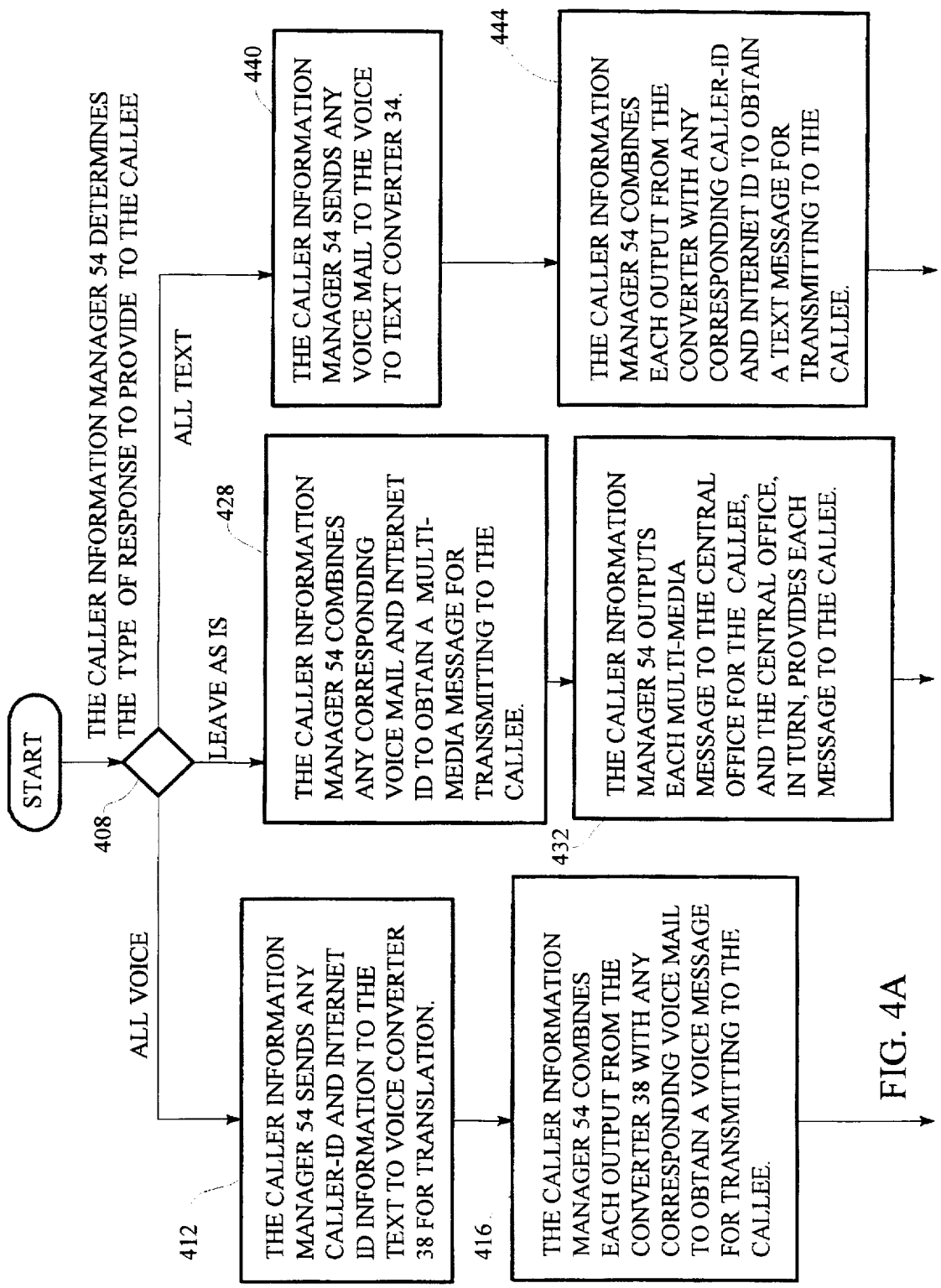
FIGS. 4A and 4B provide a flowchart of the high level steps performed when the central office for the callee receives a caller's identification information and subsequently outputs to the callee this information in a desired form.
Figure 4B:
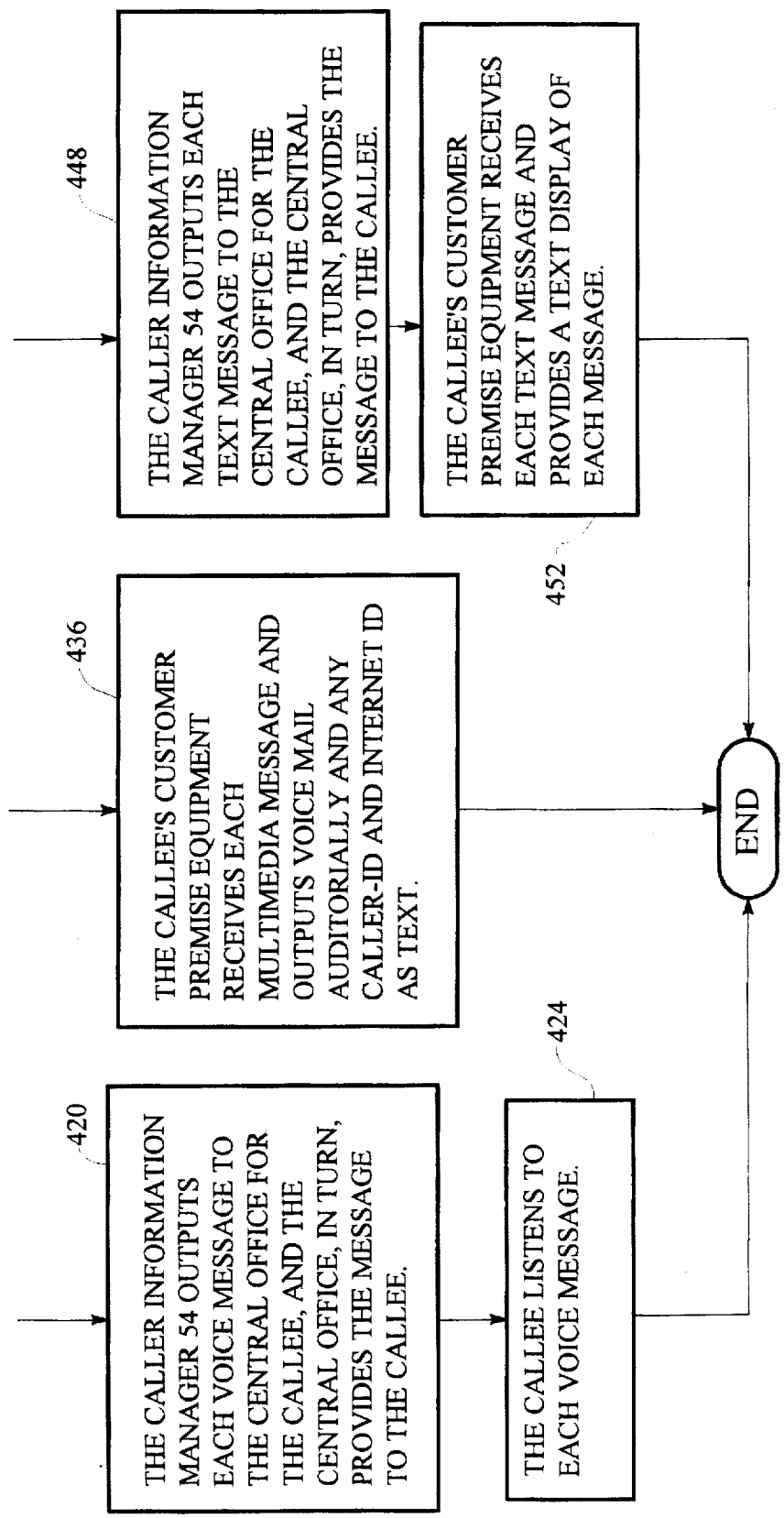

FIG. 4 presents a flowchart of the high-level steps performed when the caller information manager 54 generates or assembles a message in step 328 of FIG. 3 and subsequently outputs such a message to the callee. Accordingly, in step 408, the caller information manager 54 determines the type of message to provide to the callee. Accordingly, three separate paths are possible for the three possible responses for the present embodiment of the invention (i.e., all voice, all text or a combination). Referring now to the path of steps 412 through 424, these steps are performed when the caller information manager 54 determines that the response to the callee is to be entirely audible (i.e., voice). Thus, in step 412, the caller information manager 54 sends any text based caller-ID and Internet ID information (retrieved in steps 316 and 324 of FIG. 3) to the text-to-voice converter 38 for translation. Subsequently, upon receiving such a translation, the caller information manager 54 combines each output from the converter 38 with any corresponding voice mail thereby generating a voice message for transmission to the callee. Subsequently, in step 420, the caller information manager 54 outputs the generated message to the callee via the central office, wherein the message includes audible versions of any Internet ID information, any caller-ID information and any caller voice mail. Subsequently, in step 424, the callee is able to listen to the voice message.

The alternative paths succeeding step 408 are the "leave as is" path and the "all text" path. Both of these paths are similar to the sequence of steps 412 through 424. In particular, the "leave as is" path of steps 428 through 436 creates a message wherein the message has a mixed format in that any voice mail will be designated as having an audio format whereas any caller-ID and Internet ID information will be designated as having a text format. Alternatively, in the path of steps 440 through 452, a description for generating a message having only text representations of caller-ID, Internet identification information and caller voice mail is provided analogously to steps 412 through 424 except that the voice-to-text converter 34 is utilized instead of the text-to-voice converter 38.

The foregoing discussion of the invention has been presented for purposes of illustration and description. Further, the description is not intended to limit the invention to the form disclosed herein. Consequently, variation and modification commensurate with the above teachings, within the skill and knowledge of the relevant art, are within the scope of the present invention. The embodiment described hereinabove is further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extent permitted by the prior art.

What is claimed is:

1. A method for providing to a callee an Internet identification of a telephony caller, comprising:
   storing a plurality of Internet identification data items, wherein each said Internet identification data item corresponds to an Internet user and provides Internet addressing data for use in Internet communication with the corresponding Internet user;
   receiving, from the caller, a call at a telephony central office, the call being for the callee;
   determining the caller's phone number at the central office;
   submitting a request, from the central office to said stored plurality of Internet identification data items, for Internet identification information related to the caller, wherein the request includes information related to one of a name of the caller and the phone number of the caller;
   receiving, at the central office, Internet identification information corresponding to the caller in response to said step of submitting;
   transmitting the Internet identification information corresponding to the caller to a telephony station for the callee during a ringing of the telephony station; and
   presenting the caller's Internet identification information to the callee in one of an audio form and a visual form when the callee accesses the telephony station.

2. A method as claimed in claim 1, wherein the Internet identification information includes one of an e-mail address, an Internet Universal Resource Location identifier, a Gopher address, a WAIS address and a file transport protocol address.

3. A method as claimed in claim 1, wherein the central office is a terminating central office for the call.

4. A method as claimed in claim 1, wherein said step of presenting includes retaining, in a predetermined storage area, call information relating the Internet identification information corresponding to the caller and the call when the callee does not access the telephony station during the ringing, wherein the call information is accessible by the callee at a time after the call terminates.

5. A method as claimed in claim 4, wherein said step of presenting includes sending the callee the Internet identification corresponding to the caller from the predetermined storage area for call information when the callee calls a predetermined number.

6. A method as claimed in claim 5, wherein said step of sending includes determining one of an audio and a visual format in which to send the Internet identification corresponding to the caller, said determination being dependent on the predetermined phone number.

7. A method as claimed in claim 5, wherein said step of sending includes correlating the Internet identification with additional information for the call so that the additional information is sent to the callee with the Internet identification, said additional information is at least one of caller-ID information and a caller voice message.

8. A method as claimed in claim 5, wherein said step of sending includes providing an interactive interface when the callee calls the predetermined phone number.

9. A method as claimed in claim 1, wherein said step of presenting includes storing said Internet identification corresponding to the caller in customer premises equipment for the callee.

10. A method as claimed in claim 1, wherein said step of presenting includes displaying the Internet identification corresponding to the caller on an enlarged presentation window of a caller-ID output device at the premises of the callee.

11. A method as claimed in claim 1, wherein said step of presenting includes requesting an Internet display page related to the caller for display at the premises of the callee.

12. A method as claimed in claim 1, wherein said step of presenting includes providing the caller's Internet identification information to the callee through an Internet phone at the premises of the call.

13. A method as claimed in claim 1, further including accessing, by a directory assistance service, said plurality of Internet identification data items for an Internet identification corresponding to one of a name and a telephone number of an Internet user when a telephony subscriber requests said Internet identification information corresponding to one of the name and the telephone number of the Internet user.

14. An apparatus for providing Internet identification of a telephony caller to a telephony callee, comprising:
   customer premises equipment at a callee's premises for receiving calls;
   a telephony caller information manager for receiving caller information of a caller calling the callee's customer premises equipment;
   a repository for storing an Internet address for the caller;
   a telephony switching means in operative communication with said customer premises equipment, said caller information manager and said repository, wherein upon detection of a call to the callee from the caller, the telephony switching means communicates with the caller information manager so that the caller information manager receives an Internet address for the caller stored in said repository;
   message means for providing a message to said customer premises equipment, wherein said message means incorporates said Internet address received by the caller information manager into said message.

15. An apparatus as claimed in claim 14, wherein said customer premises equipment includes one of a caller-ID device, data terminal and modem and an Internet phone.

16. An apparatus as claimed in claim 14, wherein said caller information manager includes a means for accessing caller information using a telephone number for the caller.

17. An apparatus as claimed in claim 14, wherein said repository includes a data base having the Internet address of the caller retrievable by using a telephone number for the caller.

18. An apparatus as claimed in claim 14, wherein said telephony switching means includes a terminating central office for the callee.

19. An apparatus as claimed in claim 14, wherein said message means includes message generation means for generating said message in a form so that a content of said message is presented to the callee in one of: an audio form, a text form and a combination of audio and text forms.

20. An apparatus as claimed in claim 14, further including an Internet phone that transmits caller Internet identification information in a form that is displayable at the customer premise equipment.

21. An apparatus as claimed in claim 20, wherein the customer premise equipment includes a modem and one of a data terminal and monitor.

22. An apparatus as claimed in claim 14, further including an Internet phone that presents caller Internet identification information to the callee, wherein the Internet phone decodes the Internet identification information according to a format of the Internet identification information.

23. An apparatus as claimed in claim 22, wherein said format is one of a standard telephony format and a format based on an Internet protocol.

* * * * *